United States Patent
Herndon

(10) Patent No.: US 6,872,079 B1
(45) Date of Patent: Mar. 29, 2005

(54) BOW TYING LEARNING DEVICE

(76) Inventor: John Herndon, 1627 Patton Ave., Charlotte, NC (US) 28216

( * ) Notice: Subject to any disclaimer, the term of this patent is extended or adjusted under 35 U.S.C. 154(b) by 0 days.

(21) Appl. No.: 10/682,626

(22) Filed: Oct. 9, 2003

Related U.S. Application Data

(60) Provisional application No. 60/417,955, filed on Oct. 11, 2002.

(51) Int. Cl.[7] .............................................. G09B 19/24
(52) U.S. Cl. ...................... 434/258; 434/260; 289/1.2; 289/17; 289/18.1
(58) Field of Search .......................... 289/1.2, 17, 18.1; 434/258, 260

(56) References Cited

U.S. PATENT DOCUMENTS

| | | | | |
|---|---|---|---|---|
| 2,624,957 A | * | 1/1953 | Collins ........................ | 434/260 |
| 4,017,984 A | * | 4/1977 | Bonfigli ....................... | 434/260 |
| 4,092,786 A | * | 6/1978 | Neese .......................... | 434/260 |
| 4,842,522 A | * | 6/1989 | Alexander et al. .......... | 434/260 |
| 5,110,296 A | * | 5/1992 | Cohen ......................... | 434/260 |
| 5,897,323 A | * | 4/1999 | Stanfield ..................... | 434/260 |

OTHER PUBLICATIONS

Advertisements.

* cited by examiner

*Primary Examiner*—Derris H. Banks
*Assistant Examiner*—Dmitry Suhol
(74) *Attorney, Agent, or Firm*—Kennedy Covington Lobdell & Hickman, LLP

(57) ABSTRACT

A method and device for assisting and teaching a child to tie a bow in a shoestring which includes a base member and an extended string attached to the base member with the two sides thereof extending loosely from the base member. A holding member is supporting above the base member and has securing elements thereon spaced from one another and formed to temporarily hold said ends of said string in place thereat to permit said child to manipulate the string and form a bow in the string. Preferably, the string and the securing elements are color coded to assist the child in manipulating the string in a series of steps to form a bow in the string.

8 Claims, 2 Drawing Sheets

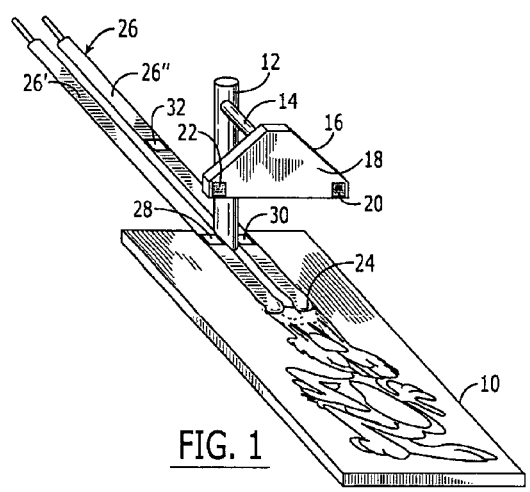
FIG. 1
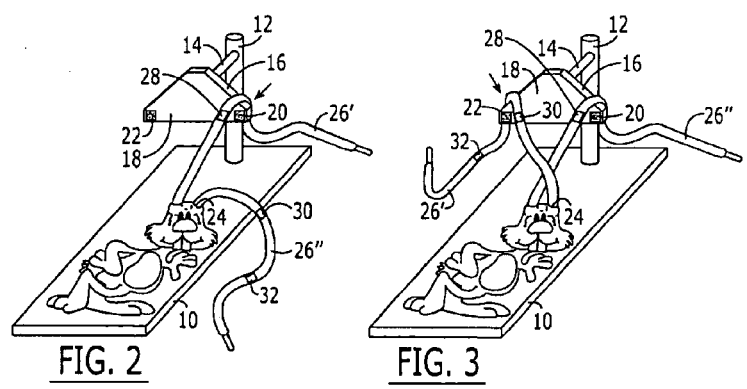
FIG. 2
FIG. 3

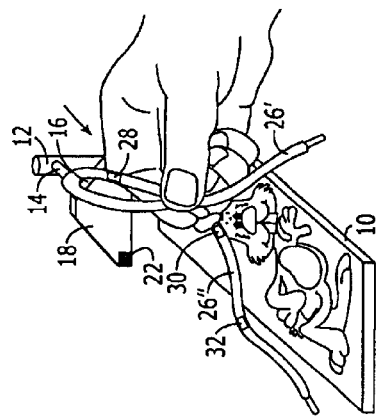
FIG. 4
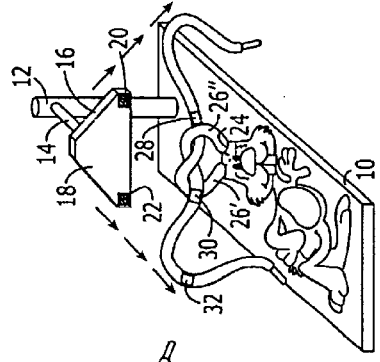
FIG. 5
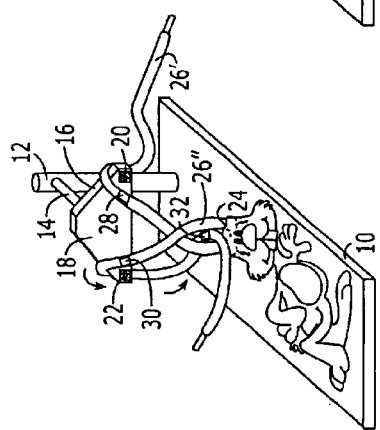
FIG. 6
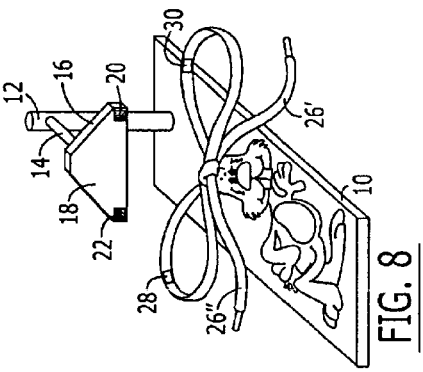
FIG. 7
FIG. 8

BOW TYING LEARNING DEVICE

CROSS-REFERENCE TO RELATED APPLICATION

This application is entitled to the benefit of, and claims priority to, provisional U.S. patent application Ser. No. 60/417,955 filed Oct. 11, 2002 and entitled "BOW TYING LEARNING DEVICE," the entirety of which is hereby incorporated by reference.

FIELD OF THE INVENTION

The present invention relates generally to a method and apparatus for assisting children in learning how to tie shoestrings into a bow, and more particularly to a mechanical device which permits a child to easily go through the steps of tying a bow as part of a learning process.

BACKGROUND OF THE INVENTION

It is desirable for children to learn to tie their own shoes at the earliest age so that the child becomes more self-reliant, and parents and others are spared the chore of always having to tie the shoestrings for the children. However, because young children have limited manual dexterity, and because the steps required to tie a bow in a shoestring are somewhat difficult and confusing for a child, the time required to teach a child to tie a bow can be lengthy and difficult.

There are several known devices for assisting children in learning how to tie their shoestrings. The simplest known device is a printed poster, usually done with bright colors and drawings that are attractive to children, which set out in sequence each of the steps required to tie a bow. This solution to the problem however is generally inadequate because it fails to physically assist the child in learning to tie a bow.

It is also known to utilize an enlarged cover that the child can slide over his or her shoe, and this cover is provided with very large shoestrings which make shoe tying and lacing easier than the much smaller shoestrings found in a child's shoe. While this device does make it easier to teach lacing and tying of a shoestring, it still lacks any mechanical device for physically assisting a child in learning how to tie a bow in a shoestring.

SUMMARY OF THE INVENTION

Briefly summarized, the present invention includes a device for assisting and teaching a child to tie a bow in a shoestring. In the preferred embodiment of the invention, the device includes a base member; an extended string attached to the base member with the two ends thereof extending loosely from the base member; a holding member supported above the base member and having securing elements thereon spaced from one another and formed to temporarily hold the ends of the string in place thereat to permit the child to manipulate the string and form a bow in the string.

The base member may include two holes therethrough with the string being threaded through the holes so that the approximate center of the string is between the holes and the ends of the string extend away from the holes and have substantially equal lengths.

Each of the ends of the string may have first and second different colored indicators positioned thereon, respectively, at a predetermined distance from the base member corresponding generally to the distance between the base member and the securing elements, and the securing elements on the holding member may each have a different color that correspond, respectively, to the first and second color indicators on the ends of the strings. Also, one of the string ends may have a third colored indicator that is different from the first and second colored indicators, and that is located between one of the first or second colored indicators and the tip end of one of the ends of the string.

Preferably, a vertically extending post is removably mounted in the base member to extend upwardly therefrom, and the holding member is removably attached to the post, whereby all elements of the device can be easily assembled and disassembled.

The base member may include a drawing of a rabbit thereon, and the holes in the base member may be located where the ears of the rabbit should be located whereby the string, when tied in a bow, has the appearance of ears for the rabbit.

The present invention also includes a method of assisting and teaching a child to tie a bow in a shoestring which includes the steps of: placing two different color indicators on a length of string at predetermined locations along the length thereof; providing a base member for holding the string at the center portion of thereof so that the ends of the string can extend loosely from the base member; positioning two securing elements above the base member with each of the securing elements being colored to correspond to the color of one of the color indicators on the string, respectively; temporarily securing one end of the string to one of the securing members so that the colored indicator on the end of the string is positioned adjacent the securing member of the same color; temporarily securing the other end of the string to the other one of the securing members so that the colored indicator on the other end of the string is positioned adjacent the other securing member of the same color; and manipulating the tip ends of both the ends of the string to form a bow in the string while the ends of the string are temporarily secured to the securing members.

BRIEF DESCRIPTION OF THE DRAWINGS

FIG. 1 is a perspective view of a preferred embodiment of the device of the present invention;

FIG. 2 is a view similar to FIG. 1, and showing one of the steps for using the device to form a bow;

FIG. 3 is a view similar to FIG. 1, and showing another of the steps for using the device to form a bow;

FIG. 4 is a view similar to FIG. 1, and showing another of the steps for using the device to form a bow;

FIG. 5 is a view similar to FIG. 1, and showing another of the steps for using the device to form a bow;

FIG. 6 is a view similar to FIG. 1, and showing another of the steps for using the device to form a bow;

FIG. 7 is a view similar to FIG. 1, and showing another of the steps for using the device to form a bow; and FIG. 8 is a view similar to FIG. 1, and showing another of the steps for using the device to form a bow.

DESCRIPTION OF THE PREFERRED EMBODIMENT

Looking now in greater detail at the accompanying drawings, the preferred embodiment of the present invention is a device that includes a flat, preferably rectangular, base member 10 that can easily rest on any flat surface, and a post member 12 that is fitted in a hole in the base member 10 so as to extend vertically upwardly from the base member 10. A holding member 16 is mounted at the extending end of a rod 14 that extends horizontally between the post 12 and the holding member 16, whereby the holding member is disposed above the base member 10. The holding member 16 has a vertically extending front face 18 that includes a first securing member 20 mounted on one side thereof, and a second securing member 22 mounted on the other side thereof. The securing members 20 and 22 are preferably a form of Velcro®, but they can be formed of any material that will temporarily hold a string in place during the bow tying procedure which will be discussed in greater detail below. Preferably, the first securing member 20 is made of a distinctive color, such as green, and the second securing member 22 is made from a different distinctive color, such as red.

A pair of openings 24 are formed in the base member 10 directly beneath the front face 18 of the holding member 16, and a string 26, which may any type of string but is preferably a conventional shoestring, is threaded downwardly through one of the holes 24 and then upwardly through the other hole 24 so that the center portion of the shoestring 26 forms a loop on the bottom surface of the base member 10 (shown in dotted lines in FIG. 1), and the two end portions 26' and 26" of the shoestring extend loosely along the upper flat surface of the base member 10. The shoestring end 26' has a color-coded portion 28 which corresponds in color to the first securing member 20 (e.g. green), and a second color-coded portion 30 on the end 26" of the shoestring that corresponds in color to the second securing member 22 (e.g. red). It is also to be noted that the length of the shoestring ends 26' and 26" between the holes 24 and the first and second color coded sections 28, 30 correspond generally to the height of the first and second securing members 20, 22 above the top surface of the base member 10. The shoestring end 26"may also be formed with a third color-coded section 32 that is located between the second color-coded section 30 and the tip end of the shoestring end 26", and it is a different color (e.g. yellow) from the first and second color-coded sections 28, 30. This third color-coded section 32 can be used to assist in forming the bow, as will be explained in greater detail below.

By supporting the holding member 16 using the horizontally extending rod 14, adequate space is provided in front of the post 12 to let a child manipulate the shoestring in forming a bow as will be explained in greater detail below, but if desired the holding member 16 could be mounted directly to the post 12, or it could be supported above the base member 10 using any equivalent mounting structure.

In the preferred method of using the device of the present invention in teaching a child to tie a bow, the following steps can be taken, and for convenience of understanding these steps the end 26' of the shoestring will be referred to as the green string and the end 26" of the shoestring 26 will be referred to as the red string:

1. Form an "X" by connecting the green string 26' to the green securing member 20 (see FIG. 2) and then connecting the red string 26" to the red securing member 22 (see FIG. 3), preferably with the ends of both the red and green strings hanging over the back of the triangular holding member 16;
2. Move the end of the red string 26" to the right to go through the front and bottom portion of the "X"(see FIG. 4);
3. Pull the ends of both strings to make the base of the bow (see FIG. 5);
4. Connect the green string 26' to the first green securing member 20 with the end portion hanging downwardly in front of the triangular piece (see FIG. 6);
5. Make the loop of the bow by holding between the thumb and index finger a length of the green string 26' that corresponds generally to the vertical height of the triangular holding member 16, and wrap the red string 26" around the front of the green string 26'(over the thumb) to the back of the opening of the first loop in the green string 26'(see FIG. 7);
6. Form a second loop in the red string 26" and push it through the loop in the green string 26' beneath the opposite cross-over portion of the red string 26". For this step, the red string 26" includes the third color-coded section 30 which identifies the portion of the red string 26" that should be grasped in pushing it through the loop in the green string 26'(see FIG. 7); and
7. Pull the loops of both strings 26' and 26" together to form the knotted bow (see FIG. 8).

One of the features of the present invention is the fact that the first and second securing members 20, 22 are utilized to temporarily hold the ends 26' and 26" of the shoestring in their proper positions without any assistance from the child while the child is manipulating other portions of the shoestring as described above. Thus, the device of the present invention, and its method of use, provide a significantly improved arrangement for teaching children how to tie a bow in a shoestring.

For convenience in packaging the present invention, the post 12 can be removed from its hole in the base member 10, the rod 14 may be removable from the post 12, and the holding member 16 may be removable from the rod 14 so that all of these separate pieces can be packaged in a small container.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A device for assisting and teaching a child to tie a bow in a shoestring which includes:
   (a) a base member;
   (b) an extended string attached to said base member with the two ends thereof extending loosely from said base member;
   (c) a holding member supported by a vertically extending post to extend in a horizontal direction away from said post and above the base member and having at least two separate and distinct securing elements thereon spaced horizontally from one another and each said securing member being formed of a material for temporarily grasping a different one of said two ends of said string in place at a horizontal spacing from one another to permit said child to manipulate the string and form a bow in the string.

2. A device for assisting and teaching a child to tie a bow as defined in claim 1, wherein said base member includes two holes therethrough, and wherein said string is threaded through said holes so that the approximate center of the string is between said holes and said ends of said string extend away from said holes and have substantially equal lengths.

3. A device for assisting and teaching a child to tie a bow as defined in claim 1, wherein each said ends of said string have first and second different colored indicators located thereon, respectively, at a predetermined distance from said base member corresponding generally to the distance between said base member and said securing elements, and wherein said securing elements on said holding member each have a have different color that correspond, respectively, to said first and second color indicators on said ends of said strings.

4. A device for assisting and teaching a child to tie a bow as defined in claim 3, wherein one of said string ends has a third colored indicator that is different from said first and second colored indicators, and that is located between one of said first or second colored indicators and the tip end of one of said ends of said string.

5. A device for assisting and teaching a child to tie a bow as defined in claim 1, wherein a vertically extending post is removably mounted in said base member to extend upwardly therefrom, and where said holding member is removably attached to said post, whereby all elements of the device can be easily assembled and disassembled.

6. A device for assisting and teaching a child to tie a bow as defined in claim 1, wherein said base member includes a drawing of a rabbit thereon, and wherein said holes in said base member are located where the ears of the rabbit be located whereby the string, when tied in a bow, has the appearance of ears for said rabbit.

7. A device for assisting and teaching a child to tie a bow in a shoestring which includes:

(a) a generally flat base member formed with two spaced apart holes passing through said base member;

(b) an extending string threaded through said holes in said base member with the center portion thereof extending between said two holes in said base member and with the two ends thereof extending loosely from said base member, with each of said ends of said string having first and second different colored indicators located thereon, respectively, at a predetermined distance from said base member;

(c) a post member removably mounted in said base member and extending vertically upward therefrom; and, (d) a holding member removably mounted to said post member and positioned above said base member at a distance corresponding generally to said predetermined distance between said first and second colored indicators and said base member, said holding member having securing elements mounted thereon in spaced relation to one another and formed to temporarily hold said ends of said string in place thereat, said securing elements each having a different color that corresponds, respectively, to the colors of said first and second color indictors on said ends of said string.

8. A device for assisting a child in tying a bow as defined in claim 7, wherein one of said string ends has a third colored indicator that is different from said first and second colored indicators, and that is located between one of said first or second colored indicators and the tip end of one of said ends of said string.

* * * * *